United States Patent [19] [11] 3,752,523
Bierbrauer [45] Aug. 14, 1973

[54] IMPACT ABSORBING VEHICLE BUMPER
[76] Inventor: Henry C. Bierbrauer, 7440 Oxford, Minneapolis, Minn. 55426
[22] Filed: Dec. 27, 1971
[21] Appl. No.: 212,388

[52] U.S. Cl. .................. 293/89, 293/87, 188/1 C
[51] Int. Cl. ........................................... B60r 19/04
[58] Field of Search ................... 293/1, DIG. 4, 30, 293/70, 85, 86, 87, 89; 188/1 C

[56] References Cited
UNITED STATES PATENTS
3,506,295   4/1970   Yancey ............................... 293/87
1,640,145   8/1927   Donegan ............................. 293/87
3,412,628   11/1968  DeGain ................................ 293/1
1,738,458   12/1929  Sorce .................................. 293/30
3,373,630   3/1968   Heurtebise ....................... 188/1 C Primary Examiner—Gerald M. Forlenza
Assistant Examiner—Robert Saifer
Attorney—Carlsen, Carlsen & Sturm

[57] ABSTRACT

A vehicle bumper having an inner cross beam mounted on the vehicle frame and an outer bumper bar extending parallel to the beam in horizontally spaced relation thereto with the bumper bar end portions angling inwardly beyond the beam in protective positions outside of the vehicle fenders, the bumper bar being mounted on the beam by a plurality of U-shaped metal brackets having their legs respectively bolted to the beam and bar so that the bight portions of the brackets will buckle and absorb the impact of a collision force directed inwardly against the bumper bar. The brackets are independently mounted in pairs spaced apart longitudinally of the bumper bar.

2 Claims, 3 Drawing Figures

PATENTED AUG 14 1973    3,752,523

3,752,523

IMPACT ABSORBING VEHICLE BUMPER

BACKGROUND OF THE INVENTION

Vehicle bumpers are designed primarily for protecting the vehicle body from damage upon impact with another vehicle, tree, post, building or the like. Various types of mountings have been provided for absorbing impact shock, some being resilient and others being permanently deformable. The present invention is concerned with the latter type of collapsible or crushable bumper wherein the collapsed components thereof may be readily replaced. U.S. Pat. No. 3,506,295 to Yancey discloses this general type of bumper.

SUMMARY OF THE INVENTION

The primary object of the invention is to provide an impact absorbing vehicle bumper adapted to cushion vehicle impact by deformation of components thereof and yet which can be readily and inexpensively repaired.

With this and other objects in view the invention broadly comprises an inner cross beam mounted to extend across the front or rear of the vehicle frame, as the case may be, a bumper bar spaced outwardly from the beam in general parallelism thereto, the bumper bar being connected to the beam by a plurality of pairs of U-shaped metal brackets spaced apart longitudinally of the bumper between the beam and bumper bar with the legs of each bracket respectively secured to the beam and bar and the bight portion thereof deformable to absorb compressive force between the bumper bar and beam.

DESCRIPTION OF THE PREFERRED EMBODIMENT

Figure 1:
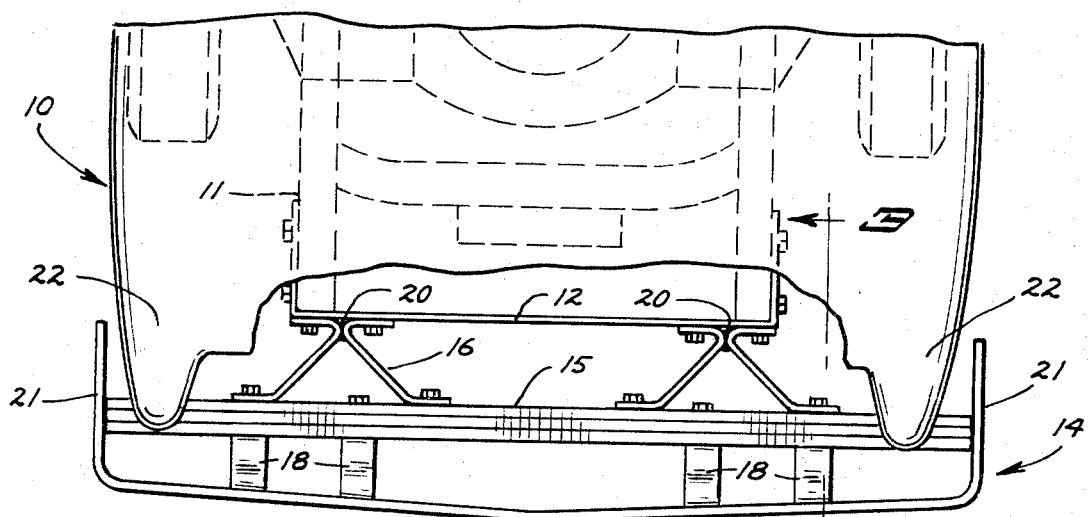
FIG. 1 is a top plan view of the bumper mounted on the front of a vehicle with the vehicle body partially broken away to show the connection of the bumper with the vehicle frame.

Referring now more particularly to the drawing reference numerals will be used to denote like parts or structural features in the different views. The numeral 10 denotes generally a vehicle having a chassis 11 with a frame member 12 extending across the front end thereof. Obviously the frame or chassis structures of various automobiles take various forms.

The bumper structure is denoted generally by the numeral 14. It comprises a cross bar or beam 15 connected to the frame member 12 by mounting brackets 16 and a slightly curved bumper bar 17 supported to extend transversely across the front of the vehicle in forwardly spaced parallelism to beam 15. The connection between members 15 and 17 is made by a plurality of upper and lower U-shaped brackets denoted respectively at 18 and 19. The inner brackets are slightly larger than the outer to allow for the curvature in bar 17.

The brackets 16 are reversely identical and diverge in their outward extension as shown to brace cross beam 15 against longitudinal movement when endwise forces are applied thereto. These brackets 16 at each end are welded together as at 20.

Beam 15 is here shown as being formed by several sheets of plywood although, with lightness and strength both being important factors, it might also be formed of an aluminum alloy. The bumper bar 17 is preferably formed of an aluminum alloy and has its end portions angled rearwardly as at 21 to protect the front portions of vehicle fenders 22. Bar 17 is provided with a layer of rubber 24 bonded to the bar along its entire outer surface. This is an economical cover for the bar 17 and serves to prevent scratching when the bumper engages the bumper of another vehicle as one is used to push the other.

Brackets 18 and 19 are identical in design. Each bracket is U-shaped formed of heavy sheet steel having a thickness in the range of 0.135 to 0.175 of an inch. Each of the legs of each bracket is provided with two apertures for the reception of bolts 25 at one side to secure the bracket to beam 15 and bolts 26 on the other side to secure the bracket to bumper bar 17. The bight portions 27 and 28 of brackets 18 and 19 are formed in a broad obtuse angle with a medial bend.

It will be noted that cross beam 15 extends laterally under or through the fenders 22 to contact and give support to bumper bar portions 21 to resist their inward deformation.

Figure 2:
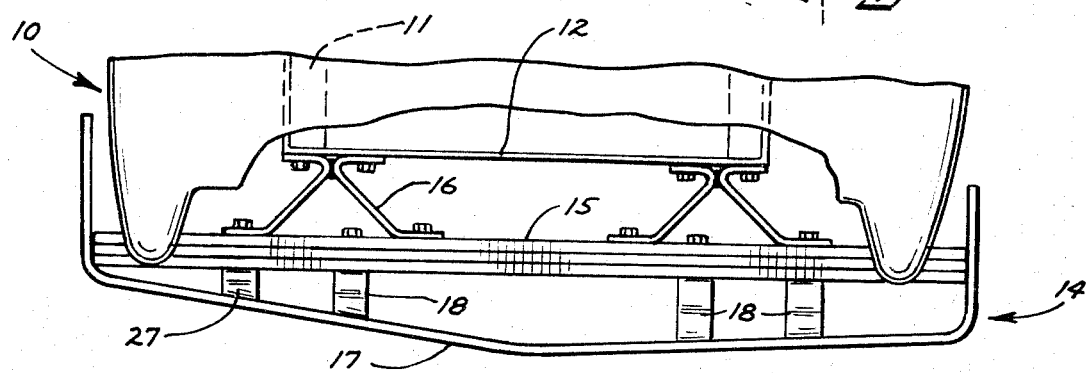
FIG. 2 is similar to FIG. 1 but shows one side of the bumper bent inwardly after absorbing an impact shock.
Figure 3:
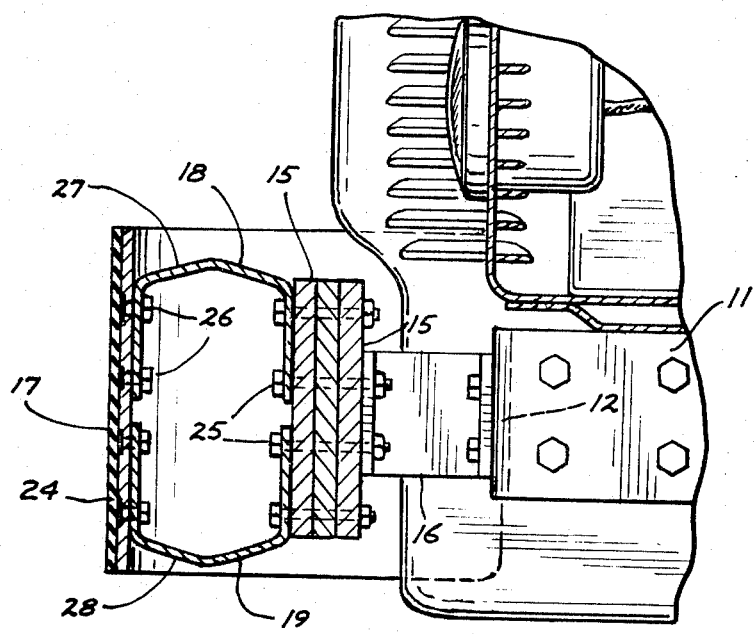
FIG. 3 is an enlarged vertical section taken on line 3—3 of FIG. 1.

A collision impact is infrequently centered laterally on the bumper but is rather absorbed by one side or the other as shown in FIG. 2. As this occurs the brackets 18 and 19 resistably collapse with the portions 27 and 28 bending on the line of their medial bend. Brackets 18 and 19 are sufficiently stiff to absorb an impact of an average weight passenger automobile at 5 to 12 miles per hour before contact of the bumper bar 17 with the beam 15. This absorption prevents damage to the frame 11 or jumping of the bumper 14 relative to that on another vehicle to cause damage to the fenders 22. At much lighter impacts of 2 to 3 miles per hour the brackets 18 and 19 will not be deformed but will absorb the force through their limited inherent resistance.

After such a collision the bumper bar 17 may be straightened and new brackets 18 and 19 are bolted in position to replace those that have been damaged.

Having now therefore fully illustrated and described my invention, what I claim to be new and desire to protect by United States Letters Patent is:

1. In a vehicle bumper
   a. an inner cross beam mounted on the vehicle frame to extend transversely across one end of the vehicle,
   b. an outer bumper bar extending generally parallel to the beam in horizontally spaced relation thereto,
   c. the end portions of the bumper bar angling inwardly beyond the beam with the ends of the beam engaging outwardly thereagainst to resist inward collapse of said end portions,
   d. the bumper bar being connected to the beam by a plurality of U-shaped brackets mounted in pairs spaced longitudinally of the beam with the brackets in each pair being vertically spaced and opening toward each other and each bracket having one leg bolted to the beam and the other leg bolted to the bumper bar with the bight portion of the bracket extending therebetween, and
   e. said brackets being formed of relatively nonresilient sheet steel and having the bight portion thereof provided with a medial bend facing the open end of the bracket and extending parallel to the beam so that a collision impact on the outer side of the bumper bar will cause the brackets to resistably collapse about said bend and absorb said impact.

2. The subject matter of claim 1 wherein a layer of rubber is bonded to the bumper bar along its entire outer surface.

* * * * *